United States Patent [19]
Seager

[11] Patent Number: 5,218,577
[45] Date of Patent: Jun. 8, 1993

[54] WRISTWATCH RADIOTELEPHONE

[75] Inventor: Richard H. Seager, Mystic, Conn.

[73] Assignee: Timex Corporation, Middlebury, Conn.

[21] Appl. No.: 961,656

[22] Filed: Oct. 16, 1992

[51] Int. Cl.⁵ .................... G04B 47/00; A44C 5/00
[52] U.S. Cl. .................... 368/10; 368/282; 24/265 WS; 224/165; 379/430
[58] Field of Search .................... 368/10, 281–282; 24/265 WS; 224/164–165, 174; 379/90, 428, 430, 433

[56] References Cited

U.S. PATENT DOCUMENTS

| | | | |
|---|---|---|---|
| 2,120,438 | 6/1938 | Bezault | 224/164 |
| 3,032,651 | 5/1962 | Gisiger-Stahl et al. | 250/14 |
| 4,608,786 | 9/1986 | Omoto et al. | 224/164 |
| 4,817,064 | 3/1989 | Milles | 368/282 |
| 4,821,532 | 4/1989 | Jaques et al. | 24/265 WS |
| 4,847,818 | 7/1989 | Olsen | 368/10 |
| 5,008,864 | 4/1991 | Tashitake | 368/10 |
| 5,054,051 | 10/1991 | Hoff | 379/56 |
| 5,152,693 | 10/1992 | Matsui et al. | 24/265 WS |

Primary Examiner—Vit W. Miska
Attorney, Agent, or Firm—Robert R. Jackson

[57] ABSTRACT

A wristwatch radiotelephone has a plurality of substantially rigid segments connected to one another in a series by adjustable connection mechanisms connected between adjacent segments in the series. The connection mechanisms allow the segments to be arranged either in an annular array when the apparatus is to be worn on the wrist as a wristwatch, or in a more elongated array when the apparatus is to be used a hand-held radiotelephone.

19 Claims, 4 Drawing Sheets

WRISTWATCH RADIOTELEPHONE

BACKGROUND OF THE INVENTION

This invention relates to a combined wristwatch and radiotelephone, and more particularly to a wristwatch which can be converted temporarily to a form suitable for use as a hand-held radiotelephone.

Olsen U.S. Pat. No. 4,847,818 shows a wristwatch which can be removed from the user's wrist and temporarily reconfigured for use as a hand-held radiotelephone. The Olsen apparatus has many desirable features, but it would also be desirable to have a structure which formed a somewhat more definite, predetermined shape when reconfigured as a radiotelephone. This would tend to give the article a more substantial "feel" when used as a radiotelephone, thereby making the article more acceptable and attractive to at least some users.

In view of the foregoing, it is an object of this invention to provide a wristwatch radiotelephone which can be made to positively assume a definite shape of a first kind when configured for use as a wristwatch, and which can similarly be made to positively assume a definite shape of a second kind when configured for use as a radiotelephone.

It is a more particular object of this invention to provide a wristwatch radiotelephone which can be made to positively assume a predetermined substantially annular shape when configured for use as a wristwatch, and which can be made to positively assume a predetermined elongated shape when configured for use as a radiotelephone.

SUMMARY OF THE INVENTION

These and other objects of the invention are accomplished in accordance with the principles of the invention by providing a wristwatch radiotelephone comprising a plurality of substantially rigid segments. These segments are joined together end to end by mechanical connections which allow the segments to be collectively arranged either as an annulus when the apparatus is to be worn on the wrist as a wristwatch, or in a more longitudinal or elongated series when the apparatus is to be used as a radiotelephone. To permit this rearrangement of the segments, at least one of the connections between adjacent segments includes the capability of allowing the adjacent segments to be rotated approximately 180° relative to one another about an axis which passes through the connection and the adjacent portions of the associated segments and which is parallel to a plane intercepted by all of the segments when they are arranged as an annulus. In addition, at least one of the connections preferably includes the capability of allowing the associated segments to be pivoted relative to one another about an axis which is parallel to the longitudinal axis of the user's wrist when the apparatus is arranged as a wristwatch. At least some of the connections between adjacent segments are also preferably longitudinally variable, adjustable, and/or resilient to allow the spacing between adjacent segments to change so that the apparatus will fit on wrists of different sizes, to facilitate removal from the wrist, etc.

Further features of the invention, its nature and various advantages will be more apparent from the accompanying drawings and the following detailed description of the preferred embodiments.

DETAILED DESCRIPTION OF THE PREFERRED EMBODIMENTS

Olsen U.S. Pat. No. 4,847,818, which is hereby incorporated by reference herein, shows all of the electronic components and circuitry needed for a wristwatch radiotelephone. All of those same components and circuitry can be used in a wristwatch radiotelephone constructed in accordance with the present invention. Accordingly, it will not be necessary to repeat here any of the details regarding that portion of the apparatus.

Figure 1:
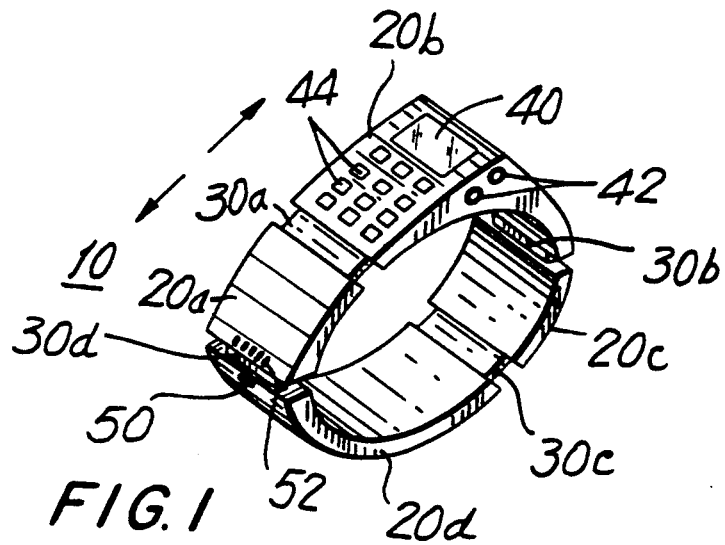
FIG. 1 is a simplified perspective view of an illustrative embodiment of a wristwatch radiotelephone constructed in accordance with the principles of this invention in the wristwatch configuration.

As shown in FIG. 1, an illustrative preferred embodiment of a wristwatch radiotelephone 10 constructed in accordance with this invention includes a plurality of substantially rigid segments 20a-d connected together end to end by mechanical connections 30a-30d. Connections 30a-30c are "permanent" connections in the sense that they always connect the two adjacent segments 20 together. Connection 30d, on the other hand, is preferably a releasable connection for releasably connecting segment 20a to segment 20d. Any suitable releasable catch may be provided between connection 30d and either of the adjacent segments 20 for allowing the user to release the connection between segments 20a and 20d, e.g., when the user remove the apparatus from his or her wrist and convert it to the radiotelephone configuration. While the provision of releasable connection 30d is preferred to help ensure that the apparatus remains securely on the user's wrist in the wristwatch configuration, if the structure is otherwise strong enough for this purpose, connection 30d could be eliminated. The structure might then be a nearly closed C shape, but because such a shape would still be substantially annular it is within the scope of words like "annular" or "annulus" as those words are employed herein (including in the appended claims).

Figure 2:
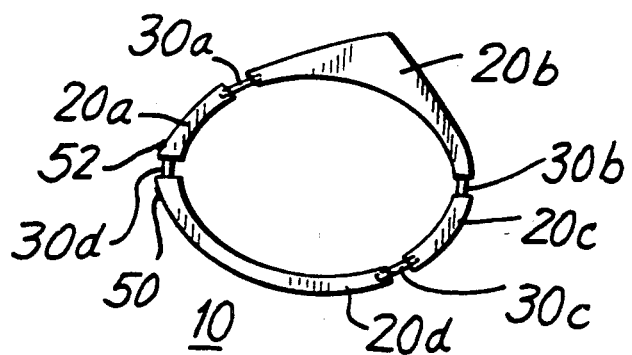
FIG. 2 is a simplified elevational view of the apparatus of FIG. 1. The control buttons shown in FIG. 1 are omitted from FIG. 2.

When arranged as shown in FIGS. 1 and 2, segments 20 and connections 30 form an annulus having size and shape suitable for wearing on the wrist. Although these components could alternatively be included on any segment or segments 20, in the depicted preferred embodiment segment 20b includes a display 40, timepiece and telephone control buttons 42, and telephone dialing buttons 44 (respectively similar to elements 10-12 in the above-mentioned Olsen patent).

When segments 20 are arranged in an annulus as shown in FIGS. 1 and 2, the inner surfaces of segments 20 define a generally elliptical shape which conforms to the elliptical shape of the human wrist. In order to allow the apparatus to fit comfortably on wrists of different sizes, at least some of connections 30 are preferably longitudinally variable, longitudinally adjustable, and/or longitudinally resilient so that the spacing between the segments 20 joined by those connections can change. For example, in the depicted preferred embodiment this is done by having the segments 20 adjacent to each of connections 30a and 30c resiliently biased toward one another parallel to axes 32a and 32c by springs in the segments, but with detents for releasably maintaining the segments at a spacing substantially greater than the minimum spacing when the segments are manually pulled far enough apart to allow the detents to engage. Of course, the detents can be overcome when the affected segments are again manually pushed together. In addition to allowing the apparatus to fit securely on wrists of different sizes, the foregoing variability of annular size may facilitate removal of the apparatus from the wrist.

Figure 5:
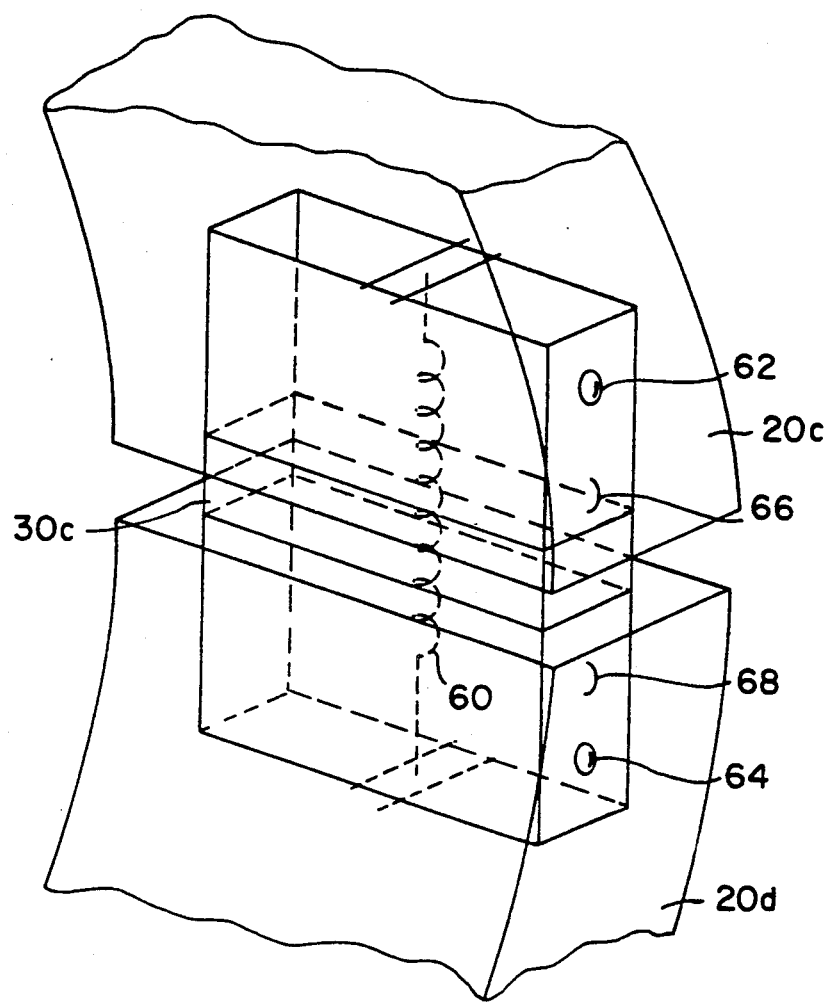
FIG. 5 is an enlarged and simplified perspective view of a portion of the apparatus of FIGS. 1-4. Several of the parts shown in FIG. 5 are shown as though transparent in order to reveal the interior construction.

Although the above-described connections of variable length could be provided in other ways, FIG. 5 shows one way in which typical connection 30c can be constructed. Hollow prismatic connection member 30c extends between prismatic sockets in segments 20c and 20d. Connection member 30c is slidably received in each of these sockets. Segments 20c and 20d are resiliently biased toward one another by prestressed tension coil spring 60 which extends between anchors on segments 20c and 20d and passes through the hollow center of member 30c. (If desired, a prestressed tension elastomeric band can be used in place of spring 60.) Electrical connections (not shown) may also extend between segments 20c and 20d via the hollow interior of member 30c. Spring-biased balls 62 and 64 extend outward from one side of member 30c inside the above-mentioned sockets. The sides of the above-mentioned sockets include recesses 66 and 68 for respectively releasably receiving the projecting portions of balls 62 and 64 when segments 20c and 20d are manually pulled apart. Spring 60 does not allow segments 20c and 20d to be pulled substantially farther apart than is required to allow balls 62 and 64 to enter recesses 66 and 68. When balls 62 and 64 are in recesses 66 and 68, they provide a detent action which prevents spring 60 by itself from retracting segments 20c and 20d toward one another. However, this detent action can be manually overcome by pushing segments 20c and 20d toward one another.

Figure 3:
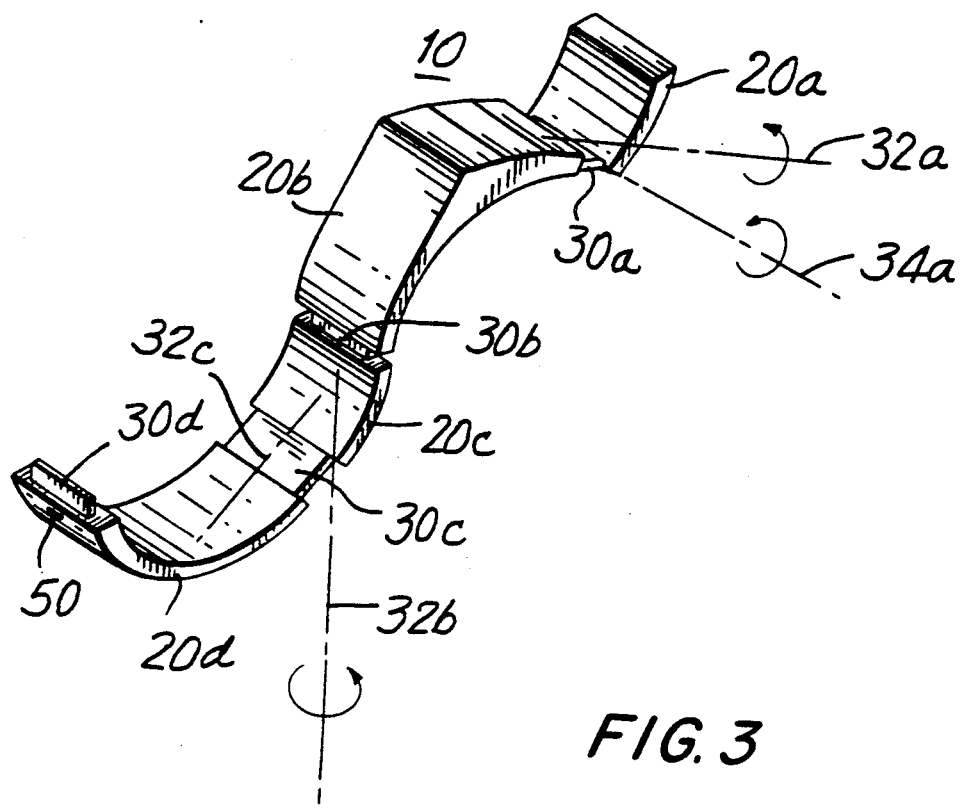
FIG. 3 is a simplified perspective view of the apparatus of FIG. 1 opened out to the radiotelephone configuration. The control buttons and display shown in FIG. 1 are omitted from FIG. 3.
Figure 4:
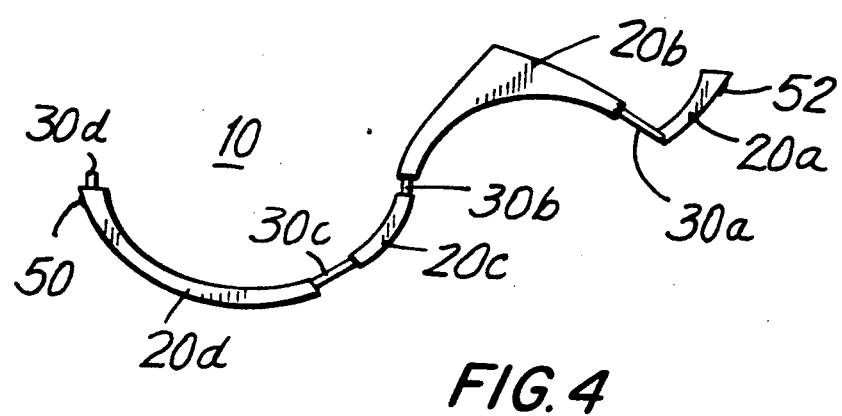
FIG. 4 is a simplified elevational view of the apparatus of FIG. 3. Again, the control buttons shown in FIG. 1 are omitted from FIG. 4.

When apparatus 10 is removed from the wrist, connections 30 allow segments 20 to be rearranged from the annular arrangement shown in FIGS. 1 and 2 to the more longitudinal or elongated arrangement shown in FIGS. 3 and 4. To rearrange segments 20 in this way, releasable connection 30d (if provided) is first released. Connection 30b then allows segment 20b to rotate 180° relative to segment 20c about the axis 32b which passes through connection 30b and adjacent portions of segments 20b and 20c parallel to a plane intercepted by all of segments 20 when apparatus 10 is in the hollow annular wristwatch form (e.g., the plane of the paper on which FIG. 2 is drawn, which is also a plane perpendicular to the longitudinal axis of the user's wrist when the apparatus is worn on the wrist as a wristwatch). Axis 32b (like other similar axes 32) may also be characterized as substantially tangent to the circumference of the annular form of the apparatus at the associated connection 30. Although the visible portion of connection 30b is rectangular in cross section, this visible portion can be rotatably connected to one or both of segments 20b and 20c concentrically with axis 32b in order to permit the above-described rotation about axis 32b. If desired, this rotatable connection can be provided with detents 180° apart so that segments 20b and 20c tend to remain in the relative rotational positions shown in either FIGS. 1 and 2 or FIGS. 3 and 4. This rotatable connection can also be provided with a stop just beyond each detent position to prevent excessive relative rotation of segments 20b and 20c which could damage electrical connections running through connection 30b between the radiotelephone components of the apparatus.

Figure 6:
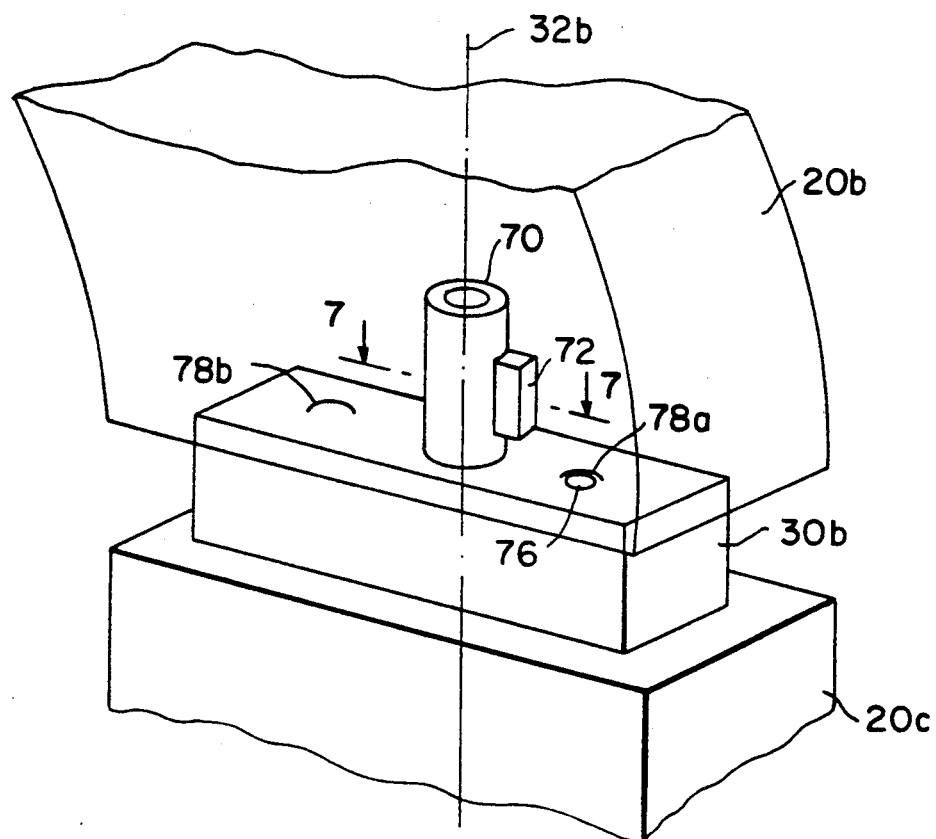
FIG. 6 is an enlarged and simplified perspective view of another portion of the apparatus of FIGS. 1-4. As in FIG. 5, several of the parts shown in FIG. 6 are shown as though transparent in order to reveal the interior construction.
Figure 7:
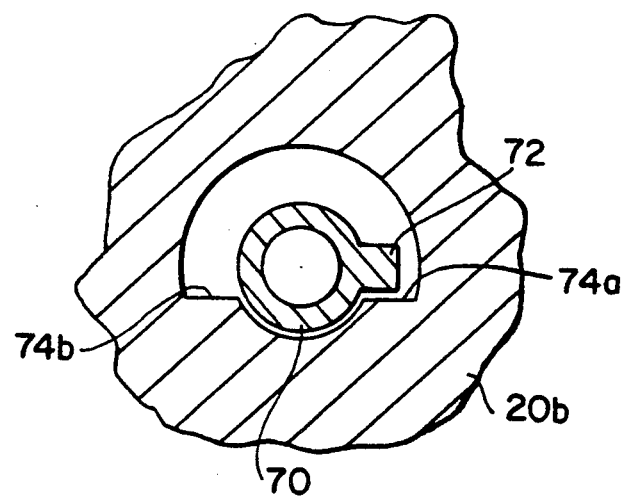
FIG. 7 is a partial sectional view taken along the line 7—7 in FIG. 6.

Again, although the above-described 180° rotatable connection could be provided in other ways, FIGS. 6 and 7 show one way in which such a connection can be constructed. Connection member 30b is rigidly connected to one end of segment 20c. A substantially cylindrical pin 70 extends from member 30b into a substantially cylindrical socket in member 20b concentric with axis 32b. Pin 70 is fixed to member 30b but is rotatable in the above-mentioned socket. Pin 70 may be hollow to provide a passageway for electrical connections (not shown) extending between segments 20b and 20c. A key 72 projecting out from a portion of one side of pin 70 cooperates with surfaces on segment 20b to hold segments 20b and 20c together. Alternatively or in addition, segments 20b and 20c may be held together by a prestressed tension elastomeric band or other similar element (like spring 60 in FIG. 5) passing through the hollow center of pin 70 between the adjacent segments. Key 72 also cooperates with surfaces 74a and 74b of the above-mentioned socket to limit rotation of pin 70 in the socket to approximately 180°. This similarly limits relative rotation of segments 20b and 20c about axis 32b. A spring-biased ball 76 projects part way out of the end of member 30b adjacent to pin 70. Recesses 78a and 78b are provided in the adjacent end of segment 20b for releasably receiving the projecting portion of ball 76. Recesses 78 are spaced from one another about axis 32b by an angle of approximately 180°. Each of recesses 78 provides a detent position for ball 76. Accordingly, segments 20b and 20c tend to remain in the relative rotational positions in which ball 76 is either in recess 78a or in recess 78b. Of course, these detents can be manually overcome to rotate segments 20b and 20c relative to one another about axis 32b when desired.

After segments 20b and 20c have been rotated relative to one another about axis 32b as described above, connection 30a allows segment 20a to be similarly rotated 180° about axis 32a. Like axis 32b, axis 32a passes through the associated connection 30a and adjacent portions of segments 20a and 20b parallel to the plane mentioned above in relation to axis 32b. As in the case of rotation about axis 32b, the above-described rotation about axis 32a can be accomplished by rotatably connecting the visible portion of connection 30a to segment 20b concentric with axis 32a. Also as in the case of rotation about axis 32b, detents and stops 180° apart can be associated with rotation about axis 32a. The 180° rotation of connection 30a can therefore be provided as shown in FIGS. 6 and 7.

After segment 20a has been rotated 180° about axis 32a as described above, segment 20a can be pivoted approximately 90° about axis 34a to better position segment 20a for radiotelephone use. Axis 34a is substantially parallel to the longitudinal axis of the user's wrist when the apparatus is on the wrist. Accordingly, axis 34a is substantially perpendicular to the plane mentioned above in relation to axes 32a and 32b. The pivotable connection between connection 30a and segment 20a concentric with axis 34a may include detents and stops 90° apart so that segment 20a tends to remain in either the 0° pivot position or the 90° pivot position about axis 34a, and so that segment 20a cannot pivot substantially beyond those two extreme positions.

Figure 8:
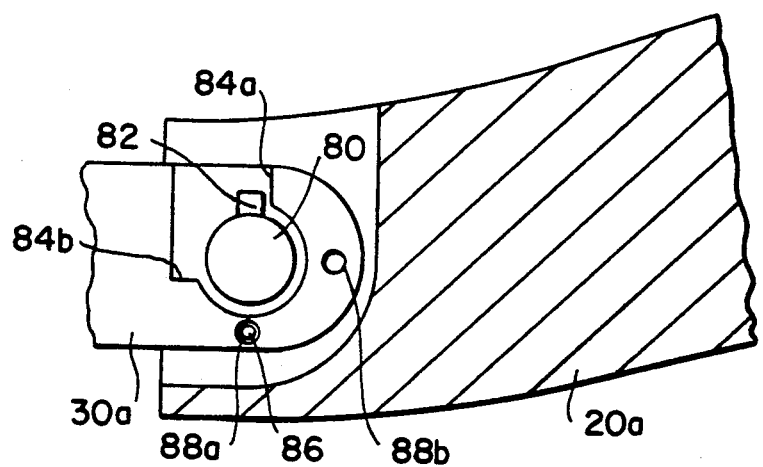
FIG. 8 is an enlarged and simplied, partial sectional view of yet another portion of the apparatus of FIGS. 1-4.

Once again, although the above-described 90° pivotable connection could be provided in other ways, FIG. 8 shows one way in which such a connection can be constructed. A pin 80, which is fixed to segment 20a, passes rotatably through an aperture near the end of connection member 30a. The longitudinal axis of pin 80 is concentric with axis 34a. Pin 80 has a key 82 which projects radially outward from a portion of one side of the pin. Key 82 cooperates with surfaces 84a and 84b on connection member 30a to limit rotation of segment 20a to an angle of approximately 90° relative to member 30a. A spring-biased ball 86 projects part way out from one of elements 20a and 30a into one of two recesses 88a and 88b in the other of these elements to provide detent positions 90° apart about axis 34a.

When apparatus 10 has been rearranged to the elongated configuration shown in FIGS. 3 and 4 and the user holds the apparatus in one hand along one side of his or her face, a radiotelephone microphone 50 at or near the connection 30d end of segment 20d and a radiotelephone speaker 52 at or near the connection 30d end of segment 20a are spaced apart and otherwise positioned and oriented for simultaneous use adjacent the user's mouth and ear. Elements 50 and 52 are respectively similar to elements 6 and 8 in the above-mentioned Olsen patent. Because all of elements 20 and 30 are substantially rigid except when deliberately adjusted as described above, the apparatus always positively assumes substantially the same predetermined shape each time it is opened up to the radiotelephone configuration as described above.

After the apparatus has been used as a radiotelephone, it can be returned to its wristwatch configuration (FIGS. 1 and 2) by reversing the above-described operations required to place it in the radiotelephone configuration.

It will be understood that the foregoing is merely illustrative of the principles of this invention, and that various modifications can be made by those skilled in the art without departing from the scope and spirit of the invention. For example, although the depicted embodiment includes four segments 20, it will be understood that a larger or smaller number of segments can be used if desired. As an illustration of this, other species of certain features of the present invention are shown in commonly assigned, concurrently filed applications Ser. No. 07/961,655, Ser. No. 07/961,655, and Serial No. 07/962,353, all of which are hereby incorporated by reference herein. Similarly, the kinds of connections 30 between adjacent segments can be varied as desired, with each connection having any desired combination of such features as the ability to extend longitudinally (like depicted connections 30a and 30c), the ability to rotate about an axis 32 which is substantially tangent to the circumference of the apparatus when it is in its annular configuration (like depicted connections 30a and 30b), and the ability to rotate about an axis 34 perpendicular to the plane defined by the apparatus when it is in its annular configuration (like depicted connection 30a). Elements 40, 42, 44, 50, and 52 can also be placed in any desired locations on the apparatus.

The invention claimed is:

1. Apparatus which is convertible between a hollow annular form in which it is suitable for wearing on the wrist as a wristwatch and an elongated form in which it is suitable for use as a hand-held radiotelephone with a microphone and a speaker adjacent respective opposite ends of said elongated form comprising:

a plurality of substantially rigid segment members, each of said segment members having respective opposite ends; and means for connecting said segment members together end to end in a series, said means for connecting comprising a connection mechanism between each adjacent pair of said segment members in said series, said segment members and said connection mechanisms being shaped so that said segment members can be disposed relative to one another to collectively form a hollow annulus in which all of said segment members are intercepted by a common plane, and a first of said connection mechanisms allowing the segment members connected by said first connection mechanism to rotate relative to one another about an axis which passes parallel to said plane through said first connection mechanism and adjacent portions of the segment members connected by said first connection mechanism to cause said segment members to be disposed in said elongated form.

2. The apparatus defined in claim 1 wherein said first connection mechanism allows the segment members connected by said first connection mechanism to rotate approximately 180° relative to one another about said axis.

3. The apparatus defined in claim 2 wherein said first connection mechanism allows the segment members connected by said first connection mechanism to rotate no more than approximately 180° relative to one another about said axis.

4. The apparatus defined in claim 1 wherein at least one of said connection mechanisms is of variable length to allow variation of the spacing between the ends of the segment members connected by said at least one connection mechanism.

5. The apparatus defined in claim 1 wherein a second of said connection mechanisms is selectively releasable from one of the segment members connected by said second connection mechanism.

6. The apparatus defined in claim 5 wherein said microphone and said speaker are respectively disposed in said segment members releasably connected to one another by said second connection mechanism.

7. The apparatus defined in claim 1 wherein at least one of said connection mechanisms allows the segment members connected by said at least one connection mechanism to pivot about a second axis which passes perpendicular to said plane through said at least one connection mechanism.

8. The apparatus defined in claim 7 wherein said at least one connection mechanism allows the segment members connected by said at least one connection mechanism to pivot approximately 90° relative to one another about said second axis.

9. The apparatus defined in claim 8 wherein said at least one connection mechanism allows the segment members connected by said at least one connection mechanism to pivot no more than approximately 90° relative to one another about said second axis.

10. The apparatus defined in claim 7 wherein said at least one connection mechanism is different from said first connection mechanism, and wherein said at least one connection mechanism also allows the segment members connected by said at least one connection mechanism to rotate relative to one another about a third axis which passes parallel to said plane through said at least one connection mechanism and the adjacent portions of the segment mechanisms connected by said at least one connection mechanism.

11. The apparatus defined in claim 10 wherein said at least one connection mechanism allows the segment members connected by said at least one connection mechanism to rotate approximately 180° relative to one another about said third axis.

12. The apparatus defined in claim 11 wherein said at least one connection mechanism allows the segment members connected by said at least one connection mechanism to rotate no more than approximately 180° relative to one another about said third axis.

13. Apparatus which is convertible between a hollow, substantially annular form in which it is suitable for wearing on the wrist as a wristwatch and a substantially elongated form in which it is suitable for use as a hand-held radiotelephone with a microphone and a speaker adjacent respective opposite ends of said elongated form comprising:
a plurality of substantially rigid segment members, each of said segment members having respective opposite ends; and
a plurality of connection mechanisms, each of said connection mechanisms connecting adjacent ends of a respective pair of adjacent segment members so that collectively said connection mechanisms connect said segment members together end to end in a series, at least some of said connection mechanisms allowing the segment members connected by those connection mechanisms to be rearranged relative to one another so that said series is either substantially annular or substantially elongated, each of said at least some connection mechanisms including means for releasable holding the segment members connected by said connection mechanism in the relative positions in which said series is substantially elongated.

14. The apparatus defined in claim 13 wherein all of said segment members lie in a plane when said series is substantially annular, and wherein one of said at least some of said connection mechanisms allows the segment members connected by said one connection mechanism to rotate approximately 180° relative to one another about an axis parallel to said plane.

15. The apparatus defined in claim 14 wherein said axis passes through said one connection mechanism and adjacent portions of the segment members connected by said one connection mechanism.

16. The apparatus defined in claim 15 wherein said one connection mechanism allows the segment members connected by said one connection mechanism to rotate no more than approximately 180° relative to one another about said axis.

17. The apparatus defined in claim 13 wherein one of said connection mechanisms is of variable length to allow variation of the spacing between the ends of the segment members connected by said one connection mechanism.

18. The apparatus defined in claim 13 wherein said series begins with a first of said segment members and ends with a last of said segment members, said apparatus further comprising:
a releasable link for releasably connecting an end of said first segment member to an adjacent end of said last segment member when said series is substantially annular.

19. The apparatus defined in claim 18 wherein said microphone and speaker are respectively disposed in said first and last segment members.

* * * * *